United States Patent
Martin

(10) Patent No.: US 6,713,415 B2
(45) Date of Patent: Mar. 30, 2004

(54) UNIFORM STRETCHABLE FABRIC WITH FLAT SURFACE APPEARANCE

(75) Inventor: Kenneth E. Martin, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/833,449

(22) Filed: Apr. 12, 2001

(65) Prior Publication Data

US 2001/0029142 A1 Oct. 11, 2001

Related U.S. Application Data

(63) Continuation-in-part of application No. 09/296,575, filed on Apr. 22, 1999, now abandoned, which is a continuation-in-part of application No. 09/165,725, filed on Oct. 2, 1998, now abandoned.

(51) Int. Cl.$^7$ ................ B32B 5/26; B32B 7/12
(52) U.S. Cl. ............. 442/389; 442/327; 442/328; 442/329; 442/366; 442/384; 428/152; 428/181; 156/163
(58) Field of Search ................. 442/327, 329, 442/384, 389, 328, 366; 428/152, 181; 156/163

(56) References Cited

U.S. PATENT DOCUMENTS

| | | | |
|---|---|---|---|
| 3,575,782 A | * 4/1971 | Hansen | |
| 4,552,795 A | 11/1985 | Hansen et al. | 428/110 |
| 4,720,415 A | 1/1988 | Vander Wielen et al. | 428/152 |
| 4,977,011 A | 12/1990 | Smith | 428/152 |
| 4,984,584 A | 1/1991 | Hansen et al. | 128/898 |
| 5,681,645 A | * 10/1997 | Strack et al. | 428/196 |

* cited by examiner

Primary Examiner—Terrel Morris
Assistant Examiner—John J. Guarriello

(57) ABSTRACT

A laundry-durable stretchable composite fabric, based on two nonwoven outer layers and a pre-stretched inner layer of elastomeric fibers of at least 400 decitex and at least eight threadlines/inch, and having a flat surface appearance, is provided.

11 Claims, No Drawings

UNIFORM STRETCHABLE FABRIC WITH FLAT SURFACE APPEARANCE

This application is a continuation-in-part of application Ser. No 09/296,575 filed Apr. 22, 1999 now abandoned, which is a continuation-in-part of application Ser. No. 09/165,725 filed Oct. 2, 1998 now abandoned.

FIELD OF THE INVENTION

This invention relates to unitary composite stretchable fabrics and, more specifically, to such fabrics having an inner layer of substantially parallel elastomeric fibers providing a flat-surface appearance.

DISCUSSION OF BACKGROUND ART

U.S. Pat. No. 3,575,782 to Hansen discloses puckered fabric-like web materials constructed using 820–1120 denier spandex yarn having 2–8 threadlines per inch of fabric width. The fabric is uniformly impregnated throughout with a polymeric binder. When the bonded composite is relaxed, shirrs or puckers with a high degree of curvature are formed; the thickness in the relaxed condition of the material is 20 mils whereas the thickness in the fully stretched condition is 7 mils.

U.S. Pat. No. 4,552,795 to Hansen discloses flat, flexible non-elastic sheet material containing, between two webs, a plurality of parallel elastomeric strands stretched to at least three times their relaxed length. At least one of the webs can be a nonwoven fabric if it contains a heat-sealable component. The sheet material can be converted to a shirred elastic condition at elevated temperatures.

U.S. Pat. No. 4,977,011 to Smith discloses elastic layered structures having controlled irregularity of pleats (shirrs). The central layer is a multiplicity of nonintersecting (within the width of the structure) elastic strands, 4 to 12 strands per transverse inch. The amplitude of the pleats are different along the elastic strands. They are bonded under tension to two nonwoven webs. When tension is released, pleats (puckers or shirrs) of controlled irregularity are formed. Alternatively, the adhesive is applied in a patterned structure. Upon relaxing, a mixture of short period low amplitude pleats and irregular high amplitude pleats are formed.

U.S. Pat. No. 4,984,584 to Hansen discloses a cohesive bandage comprising elastic yarns at 15–25 yarns per inch of width in a stretched condition, 3–5 times of their fully relaxed length, between two nonwoven webs. A polymer binder is applied (at least 50% by weight of the total) by the process of U.S. Pat. No. 3,575,782, depositing the binder throughout the structure. The structure is permitted to relax only partially (while being heat set) during the puckering step. The length of the partially relaxed web is said to be ⅓ to ⅔ of the fully extended length.

SUMMARY OF THE INVENTION

The laundry-durable unitary composite stretchable puckered fabric of this invention has substantially uniform flat surface appearance and comprises:

(a) two outer layers of nonwoven fabric of substantially equal width wherein each layer has an inside surface and an outside surface with respect to the composite fabric;

(b) a uniform inner layer of elastomeric fibers comprising at least 8 threadlines/inch (3.15 threadlines/cm) wherein the elastomeric fiber is at least 400 decitex and wherein the number of threadlines and fiber decitex are in a relationship such that the retractive force of the stretchable fabric is at least 0.22 lb/inch (38.9 g/cm); and (c) 10–35% by weight of the composite fabric of an adhesive composition bonding the outer and inner layers, wherein the adhesive only partially covers the inside surface of at least one outer layer and penetrates to the outside of each outer layer to an extent less than about 10% based on the surface area of each outer layer;

wherein the composite fabric has a calculated flatness factor of not more than 4.4.

DETAILED DESCRIPTION OF THE INVENTION

A unitary composite stretchable fabric has now been made that has a surprising combination of good laundry durability, flat surface appearance, and low-tack surfaces.

The unitary composite stretchable puckered fabric of this invention is composed of two outer layers of nonwoven fabric of substantially equal width and a uniform inner layer of substantially parallel, equally spaced elastomeric fibers of equal decitex which are capable of complete recovery from extensions as great as 300%. The elastomeric fibers can be substantially completely relaxed in the absence of externally applied forces.

"Uniform inner" layer means that the fibers are of substantially equal decitex and spacing, are substantially parallel to each other, and are subjected to substantially the same tension during preparation of the composite fabric.

The nonwoven fabrics can have a basis weight ranging from about 10 to about 30 g/m$^2$. Many types of nonwoven fabrics are suitable for use in this invention. Representative examples are nonwovens composed of thermally bonded, spunbonded and hydroentangled fibers, and the two outer layers can be the same or different. Preferably, they are composed of synthetic polymeric fibers such as polyolefin, polyester and polyamide fibers.

The layer of elastomeric fibers is composed of at least eight threadlines per inch (3.15 threadlines/cm) of width, each threadline being at least 400 decitex. Preferably the number of threadlines per inch is not greater than 16 (6.30 threadlines/cm) and, most preferably, it is 12. The combination of these two parameters is chosen to provide a minimum retractive force of about 0.22 pounds per inch (38.9 g/cm), as measured in the finished product when it is stretched at 150% of its original length. The elastomeric fibers are substantially parallel to the edges of the nonwoven fabrics. The preferred elastomeric fiber is spandex fiber.

The three layers are bonded together by an adhesive composition which constitutes from about 10% to about 35%. of the weight of the composite fabric. Adhesive content in the composite above these levels can make the fabric bond to itself. The adhesive compositions can be hot melt adhesives, preferably styrene-based block copolymers such as styrene/isoprene and styrene/butadiene block copolymers. The styrene-based portions are preferably at least about 30 wt % of the total adhesive. Each element (layer) in the composite is bonded to at least one other element of the composite. The adhesive only partially covers the inside surface of the outer fabric layer. The adhesive penetrates to the outside of each outer layer to an extent less than about 10% based on the surface area of each outer layer. "Inside surface" refers to a nonwoven layer surface that is within the composite fabric of the invention.

The composite stretchable puckered fabric can be prepared by placing between two layers of nonwoven fabric uniformly tensioned elastomeric filaments which are spaced a substantially equal distance apart and are of substantially equal decitex no less than 400 decitex per filament. There must be at least 8 filaments (threadlines) per inch of width and the threadlines are substantially parallel to each other and to the edges of the nonwoven fabrics. The three layers are bonded with an adhesive followed by removing the tension after bonding. This process produces a puckered fabric having a substantially uniform flat surface appearance which results from small substantially uniform puckers.

In a preferred process for preparing the puckered fabric, a layer of substantially parallel and equally spaced elastomeric fibers is stretched not less than 100% and placed on top of one of the layers of nonwoven fabric. An adhesive, preferably a hot melt adhesive, is applied onto the elastomeric fibers and bottom nonwoven layer. The other layer of nonwoven is then placed on top of the adhesive-treated combination and the combined structure is bonded by heat and pressure while the elastomeric fibers remain in the stretched condition. Alternatively, the adhesive can be applied to the elastomeric fibers prior to their placement between layers of nonwoven fabric. When the bonding is completed, the tension is substantially completely released and the composite fabric relaxes to form the desired puckered structure.

The hot melt adhesive can be applied in several different ways. In one method, the melted adhesive can be deposited as a discontinuous web from a spray nozzle, a process known as melt blowing. In another method, the melted adhesive can be deposited as a solid stream from a nozzle which moves in a spiral pattern as the web passes, a process known as spiral spray. Surprisingly, such a pattern in which the adhesive only partially covers an inside surface of nonwoven layers, such as is produced by melt-blowing or spiral spray, results in a uniform, flat surface appearance of the composite fabric. By "partially covers" it is meant that the adhesive is present at one part of the inside surface of the nonwoven but absent at an adjacent part. This can also be accomplished by applying a "dot matrix" pattern, as well.

The products of this invention provide a desirably smooth, tailored appearance and are useful primarily as insert elastic nonwovens, for example, as the elastic inserts in outerwear shorts.

The flatness or smoothness of the puckered fabrics of this invention can be measured by measuring the change in thickness when the fabric is stretched from its relaxed state to its ultimate elongation. The smoother the appearance of the fabric, the smaller the change in thickness on stretching. Preferably, the percent decrease in thickness is not greater than about 64%. Alternatively, one can count the number of raised portions, referred to as puckers, per linear inch of the relaxed composite fabric. Starting from a given extended length, as the number of puckers increases in the relaxed fabric, the amplitude of each pucker decreases. Fabrics with acceptable smoothness have at least 16 puckers per linear inch (6.3 puckers/cm).

A relationship of these two values, the ratio of percent decrease in thickness to the number of puckers per inch, defines the fabric of this invention well. This ratio, referred to as the flatness factor, must be about 4.4 or less, preferably less than 3.6, for a stretchable fabric to meet the limitation of substantially uniform flat appearance of this invention.

Retractive force was measured as follows:

Three-inch long samples of the relaxed stretchable fabric were elongated in an Instron instrument, model 1122, at a rate of 6 in/min (15.2 cm/min). The retractive force was recorded when the length extension reached 50%, that is, when the total length was 150% of the original length. The results were recorded as pounds per inch of fabric width. (The apparatus was calibrated to convert total pounds to pounds per inch width for fabrics which were wider than one inch.)

Thickness measurements were made with an Ames Thickness Gage. Thickness was measured on the relaxed composite fabric at three different places and the measurements averaged. The fabric was then stretched to the fullest extent possible. While stretched, the thickness was again measured at three different places and the results were averaged. From the difference in thickness values, percent decrease in thickness was calculated.

The number of puckers per linear inch was determined by placing a ruler along the length of the fabric parallel to the edge of the fabric. The number of puckers in an inch of length were counted. This was repeated at two other locations across the width of the fabric. The average of these three measurements was recorded.

An additional characteristic which is advantageous in stretchable fabrics is laundry durability. By "laundry durability" it is meant that the stretchable fabrics can undergo at least about 28 laundry cycles without showing evidence of delamination or of the nonwoven layers, whether polypropylene or polyester fiber-based nonwovens, becoming substantially longer in relation to the spandex, which would indicate loss of bonding between the spandex and the nonwoven. To demonstrate such durability, the following laundry cycle was used: 30-minute warm wash/warm rinse with 38–41° C. (100–105° F.) water and 50 g of "Tide" detergent in a Sears Kenmore Series 80 washer, followed by drying on the "normal/permanent press/medium" setting (up to 96° C. [(205° F.]) in a Sears Kenmore Series 80 dryer.

It was found particularly surprising that a non-tacky, laundry-durable, composite stretchable nonwoven fabric could be prepared, comprising 10–35 wt % of an adhesive without significantly penetration through the outer layers.

Laundry durability of unitary composite stretchable fabrics incorporating spandex can be provided by using selected adhesives having a complex viscosity (absolute value) at 120° C. of at least about 25 pascal seconds (250 poise) when the nonwoven fabric comprises polypropylene fibers and at least about 200 pascal seconds (2,000 poise) when the nonwoven fabric comprises polyester fibers.

The absolute value of the complex viscosity is defined as follows:

At a given frequency $\Omega$ and shear stress $\sigma$, the absolute value of the complex viscosity, $|\eta^*|$, is the square root of the sum of the squares of the elastic (G') and viscous (G") moduli divided by the frequency:

$$|\eta^*|=\sqrt{G'^2+G''^2}/\Omega$$

The softening point of useful adhesives exceeds 90° C. (194° F.) and preferably exceeds 110° C. (230° F.).

Examples of adhesives useful in making laundry durable unitary composite stretchable fabrics contain styrene-based block copolymers which usually also contain additives such as tackifying agents and processing oils. Where the nonwoven fabrics comprise polypropylene fibers, the adhesives include HL-1486 and HL-1470 (H. B. Fuller Company), and H-2104 and H-2494 (Ato Findley, Inc.). Where the nonwoven fabrics comprise polyester and/or polypropylene fibers, the adhesives include H-2385 (Ato Findley, Inc.) and NS-34-3260, NS-34-3322, and NS-34-5640 (National Starch Company). It was found that use of HL-8130 (H. B.

Fuller Company), complex viscosity (absolute value) at 120° C. of 15 pascal seconds, less than the minimum required 25 pascal seconds, did not result in laundry-durable stretchable fabrics with either polyester- or polypropylene-based nonwovens. All of the above named adhesives contain styrene-based block copolymers.

The complex viscosity of the adhesives was measured using a Rheometric Scientific Model DSR500 dynamic rheometer, operated in a constant stress mode. A sample of the adhesive was placed between 25 mm-diameter parallel disk fixtures. The fixtures were oscillated at a constant frequency of 10 radians/sec at an amplitude sufficient to provide a response within the linear-viscoelastic regime and a torque within the range of the transducer. Measurements were taken over a range of 60° C.–120° C. in 20-degree segments at increments of 2° C., with an equilibration time of 90 seconds at each measurement temperature. The gap between the fixtures was measured at the midpoint of each 20-degree segment so that the error due to contraction and expansion of the fixtures was less than 3%. The results, given in absolute values, were continuously graphed on a semi-log plot. The complex viscosities at 120° C. were chosen as the most relevant measure of the behavior of the adhesive in the laundry-durable unitary composite stretchable nonwovens. Laundry durability and complex viscosities (absolute values) are reported in Table 3 as wash cycles to failure and in pascal seconds, respectively.

The Examples below illustrate the invention.

EXAMPLE 1

The samples in this Example were made using 620 decitex Lycra® XA® spandex (registered trademarks of E. I. du Pont de Nemours and Company) and outer layers of Sontara® 8017 polyester fiber-based nonwoven fabric, weighing 20 g/m². Sontara® is a hydroentangled-fiber based nonwoven fabric (as described, for example, in Evans, U.S. Pat. No. 3,485,706); a product of E. I. du Pont de Nemours and Company. The spandex was stretched (see Table 1) and bonded to the nonwoven layers with hot melt adhesives. For each sample, the adhesive was melt blown onto the spandex just before contacting the bottom layer of nonwoven. For samples 1 and 2, a styrene/isoprene block copolymer-based adhesive, H-2385, was used; for samples 3 and 4, another styrene/isoprene block copolymer-based adhesive, H-2494, was used (both products of Ato Findley Inc., Wawatosa, Wis.), at 12 mg/in² (1.86 mg/cm²) and 11 mg/in² (1.7 mg/cm²), respectively. The adhesives were applied at 370° F. (188° C.) and 325° F. (163° C.), respectively. The speed of samples 1 and 2 entering the nip of a pair of rollers was 200 ft/min (61 m/min), the nip pressure was 80 psi (5.6 kg/cm²). Comparable parameters for samples 3 and 4 were 300 ft/min (91.5 m/min) and 40 psi (2.8 kg/cm²), respectively.

TABLE 1

| Sample | Lycra ® spandex decitex no./in. (no./cm) | % Stretch | Retractive Force lb/in (g/cm) | Flatness Factor |
|---|---|---|---|---|
| 1 | 620 10 (3.94) | 200 | 0.24 (42.9) | 3.32 |
| 2 | 620 5 (1.97) | 200 | 0.20 (35.7) | 5.08 |
| 3 | 620 10 (3.94) | 320 | 0.31 (55.4) | 2.70 |
| 4 | 156 10 (3.94) | 320 | 0.15 (26.8) | 6.09 |

As can be seen from the data in Table 1, fabrics having only five threadlines per inch (1.97/cm) or based on spandex at lower than 400 decitex do not have the requisite retractive force.

EXAMPLE 2

For all of the samples shown in Table 2, Lycra® XA® spandex was stretched to 200%, the H-2385 adhesive was melt blown at 370° F. (188° C.), 12 mg/in² (1.86 mg/cm²) for samples 1 and 2, 10 mg/in² (1.55 mg/cm²) for samples 3 and 4. The nip pressure was 80 psi (5.6 kg/cm²) and the process speed was 200 feet/minute (61 m/min). The Sontara® nonwoven was Style 8017 while the thermally bonded polypropylene was Style 67880 (Polymer Group, Inc.).

TABLE 2

| Sample | Nonwoven | Lycra ® spandex decitex no./in. (no./cm) | Retractive Force lb/in (g/cm) | Flatness Factor |
|---|---|---|---|---|
| 1 | 20 g/m² Sontara ® | 620 10(3.94) | 0.27 (48.2) | 3.32 |
| 2 | 20 g/m² Sontara ® | 620 14(5.5) | 0.34 (60.8) | 2.44 |
| 3 | 20 g/m² thermally bonded polypropylene | 940 10(3.94) | 0.39 (69.7) | 2.44 |
| 4 | 20 g/m² thermally bonded polypropylene | 940 14(5.5) | 0.55 (98.3) | 2.30 |

As can be seen from the data in Table 2, all of the samples are fabrics falling within this invention.

TABLE 3

| Adhesive | Laundry Durability PE[1] (wash cycles to failure) | Laundry Durability PP[2] (wash cycles to failure) | Complex Viscosity (pascal seconds) |
|---|---|---|---|
| HL-8130 | 4 | 3 | 15 |
| HL-1485 | 9 | >38 | 28 |
| HL-1470 | 11 | >38 | 27 |
| H-2104 | 16 | >38 | 68 |
| H-2494 | 27 | >38 | 34 |
| H-2385 | >28 | >38 | 761 |
| NS-34-3260 | >28 | >38 | 946 |
| NS-34-3322 | >28 | >38 | 1820 |
| NS-34-5640 | >28 | >38 | nm |

[1]Composite of Sontara ® 8017 with Lycra ® XA ®, 620 decitex elastomeric fiber.
[2]Composite of polypropylene fiber-based nonwoven (PGI 67880, a product of Polymer Group, Inc.) with Lycra ® XA ®, 620 decitex elastomeric fiber.

What is claimed is:

1. A laundry-durable unitary composite stretchable puckered fabric comprising:
   (a) two outer layers of nonwoven fabric of substantially equal width wherein each layer has an inside surface and an outside surface with respect to the composite fabric;
   (b) a uniform inner layer of elastomeric fibers comprising at least 8 threadlines/inch (3.15 threadlines/cm) wherein the elastomeric fiber is at least 400 decitex and wherein the number of threadlines and fiber decitex are in a relationship such that the retractive force of the stretchable fabric is as least 0.22 lb/inch (38.9 g/cm); and
   (c) 10–35% by weight of the composite fabric of an adhesive composition bonding the outer and inner layers, wherein the adhesive only partially covers the inside surface of at least one outer layer and penetrates to the outside of each outer layer to an extent less than about 10% based on the surface area of each outer layer;

wherein the composite fabric has a calculated flatness factor of not more than 4.4.

2. The fabric of claim 1 wherein the elastomeric fiber is spandex and each nonwoven fabric has a basis weight of about 10–30 g/m$^2$.

3. The fabric of claim 1 wherein the number of threadlines is not greater than 16 per inch (6.30/cm).

4. The fabric of claim 1 wherein the flatness factor is not greater than 3.6.

5. The fabric of claim 1 wherein the nonwoven fabric comprises hydroentangled fibers.

6. The fabric of claim 1 wherein the adhesive is a hot-melt adhesive composition; wherein the adhesive has a complex viscosity (absolute value)≧25 pascal seconds at 120° C. when the nonwoven fabric comprises polypropylene fibers and ≧200 pascal seconds at 120° C. when the nonwoven fabric comprises polyester fibers, and wherein the adhesive has a softening point above about 90° C.

7. The fabric of claim 6 wherein the adhesive composition comprises styrene-based block copolymers selected from the group consisting of styrene/isoprene and styrene/butadiene block copolymers and comprising at least about 30 wt % based on the weight of the copolymers, of styrene-based portions.

8. A process for manufacturing a laundry-durable unitary composite stretchable puckered fabric comprising the steps of:
   (a) placing between two layers of nonwoven fabric at least eight uniformly tensioned and substantially parallel elastomeric filaments per inch (3.15/cm) of width of fabric spaced substantially equidistant from and parallel to one another and to the edges of the nonwoven fabrics, wherein each layer has an inside surface and an outside surface with respect to the composite fabric, and the filaments are of substantially equal decitex of no less than 400 decitex per filament;
   (b) bonding the two layers of nonwoven fabric and the elastomeric filments by applying 10–35% by weight of the composite fabric of an adhesive composition so that the adhesive only partially covers the inside surface of at least one outer layer and penetrates to the outside of each outer layer to an extent less than about 10% based on the surface area of each outer layer;
   (c) substantially completely removing the tension immediately after the bonding step.

9. The process of claim 8 wherein the number of elastomeric filaments is ≦16/inch (6.30/cm) and each nonwoven fabric has a basis weight of about 10–30 g/m$^2$.

10. The process of claim 8 wherein the nonwoven fabric comprises fibers selected from the group consisting of polyester fibers and polypropylene fibers, and the adhesive composition has a complex viscosity (absolute value)≧25 pascal seconds at 120° C. when the nonwoven fabric comprises polypropylene fibers and has a complex viscosity (absolute value)≧200 pascal seconds at 120° C. when the nonwoven fabric comprises polyester fibers, and wherein the adhesive has a softening point above about 90° C.

11. A process for manufacturing a laundry-durable unitary composite stretchable puckered fabric comprising the steps of:
   (a) placing between two layers of nonwoven fabric at least eight uniformly tensioned elastomeric filaments per inch (3.15 per cm) of width of fabric spaced substantially equidistant from and substantially parallel to one another and to the edges of the nonwoven fabric layers, wherein each nonwoven fabric layer has an inside surface and an outside surface with respect to the composite fabric; and wherein the filaments are of substantially equal decitex of no less than 400 decitex per filament;
   (b) bonding the two layers of nonwoven fabric and the elastomeric filaments to form the composite stretchable fabric by applying an adhesive composition in amount of fron 10 to 35% by weight of the composite stretchable fabric using an adhesive application method selected from the group consisting of melt blowing and spiral spray, so that the adhesive only partially covers the inside surface of at least one nonwoven fabric layer and penetrates to the outside of each nonwoven fabric layer to an extent less than about 10% based on the surface area of the outside surface of each nonwoven layer; and
   (c) substantially completely removing the tension after the bonding step.

* * * * *